UNITED STATES PATENT OFFICE.

DORWIN D. PENNOYER, OF DOVER, NEW HAMPSHIRE, ASSIGNOR TO HIMSELF AND CALEB F. WHITCHER, OF SAME PLACE.

COMPOSITION FOR ROOFS, &c.

SPECIFICATION forming part of Letters Patent No. 240,761, dated April 26, 1881.

Application filed March 17, 1881. (No model.)

*To all whom it may concern:*

Be it known that I, DORWIN D. PENNOYER, a citizen of the United States, residing at Dover, in the county of Strafford and State of New Hampshire, have invented an Improved Composition for Roofs of Buildings, Ships' Bottoms, &c.; and I hereby declare the following to be a full, clear, and exact description of the same.

Roofs of buildings have been rendered water-tight by coating them with a preparation of coal-tar pitch, on which was afterward spread a layer of sand or gravel. When, however, a roof so coated becomes heated by the rays of the sun the pitch is liable to melt and run, leaving the roof bare and unprotected in spots and in a leaky condition, after which it is almost impossible to repair it and make it tight without removing the entire covering, which is an expensive operation.

My present invention has for its object to overcome this difficulty; and it consists in a composition formed of certain ingredients combined and treated in such a manner as to form an exceedingly elastic and durable covering for roofs, &c., which is impervious to water, and entirely free from liability to melt or crack.

I take a suitable vessel and place therein forty gallons of coal-tar, and add thereto five gallons of india-rubber dissolved in naphtha, and having about the consistence of thin tar. I then heat this mixture to a temperature of about 100° Fahrenheit, and after stirring it thoroughly add two gallons of asphaltum or black varnish and three gallons of "bright" varnish, intimately mixing the whole together, after which it is allowed to stand until nearly cool, when I add four pounds of muriatic acid, and stir the whole thoroughly together, when it is drawn off into barrels ready for use.

This composition is applied, by means of a brush, to roofs of buildings previously provided with a covering of felt, paper, or other suitable material, after which sand or fine gravel is spread over it, which adheres tenaciously to the compound, and forms a cement covering which is perfectly water-proof and will successfully resist the action of heat.

My improved composition may also be applied directly to the surface of shingles or metal plates upon the roof of a building, in which case the sand or gravel is dispensed with, and may also be used to great advantage upon ships' bottoms, as the muriatic acid in the compound will prevent barnacles from adhering thereto. Furthermore, this acid destroys or neutralizes all the inflammable qualities in the several ingredients of the composition, and renders it fire-proof.

By the employment of a solution of rubber, as described, the composition is rendered exceedingly elastic, much more durable, and less liable to crack than any other roofing composition heretofore made with which I am acquainted, while the varnishes impart body to the compound, and render its surface firm and smooth without in the least impairing or diminishing its elasticity, the rubber and varnishes thus imparting superior qualities to a roofing composition heretofore unattained.

The composition is also specially adapted for use upon metal roofing, as its elasticity effectually prevents it from becoming cracked by the alternate expansion and contraction of the metal under different temperatures, as is the case with all the paints heretofore used for this purpose, for the reason that the oil soon evaporates, when the paint cracks and peels off.

In ordinary temperatures the composition is sufficiently liquid to allow of its being readily applied, while in cold weather it must be slightly heated before using.

The composition is light, cheap, very durable, and permanently retains its elasticity under all conditions of the weather, while it is entirely free from liability to melt and run when subjected to heat, and will tenaciously adhere to any surface to which it is applied. Furthermore, a roof to which it has been applied can be easily repaired and rendered perfectly tight at a very slight expense.

What I claim as my invention, and desire to secure by Letters Patent, is—

The herein-described composition for roofs, &c., consisting of coal-tar, india-rubber dissolved in naphtha, asphaltum or black varnish, bright varnish, and muriatic acid mixed together in about the proportions named, and used with or without sand or gravel, substantially as and for the purpose set forth.

Witness my hand this 9th day of March, A. D. 1881.

DORWIN D. PENNOYER.

In presence of—
   A. P. DUTTON,
   GEO. W. JENKINS.